(No Model.)
J. S. TRUITT.
SPIRIT LEVEL SHEATH.
No. 379,259. Patented Mar. 13, 1888.
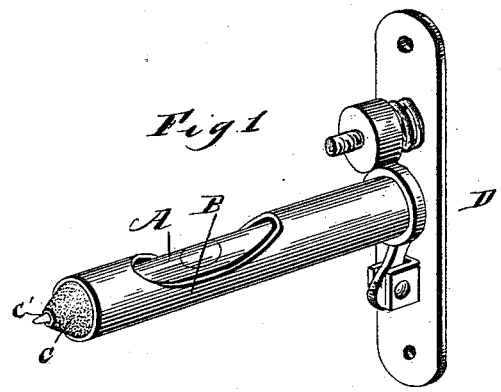
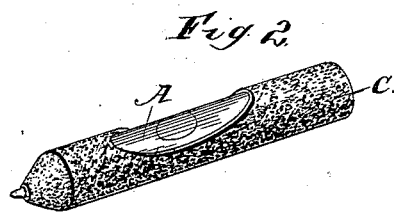
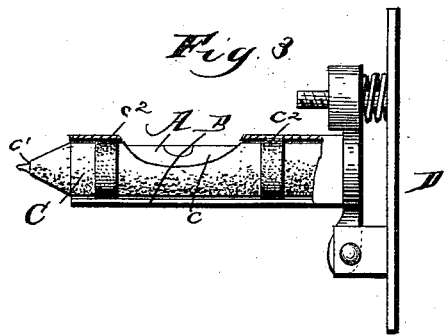
WITNESSES.
Geo. Thorpe
E. G. Siggers
INVENTOR.
James S. Truitt
by C. A. Snow & Co.
Attorneys

UNITED STATES PATENT OFFICE.

JAMES STUART TRUITT, OF HILLSBOROUGH, TEXAS.

SPIRIT-LEVEL SHEATH.

SPECIFICATION forming part of Letters Patent No. 379,259, dated March 13, 1888.

Application filed May 18, 1887. Serial No. 238,686. (No model.)

*To all whom it may concern:*

Be it known that I, JAMES STUART TRUITT, a citizen of the United States, residing at Hillsborough, in the county of Hill and State of Texas, have invented a new and useful Improvement in Spirit Level Sheaths, of which the following is a specification.

My invention relates to an improvement in spirit-level sheaths; and it consists in the construction and arrangement of the parts of the same, which will be more fully hereinafter described, and pointed out in the claim.

The object of my invention is to provide a rubber or other elastic sheath for levels, adapted to encircle the glass and prevent injury thereto in case of jars or falls, and to also form a steady securement between the level-glass and the metallic covering or housing therefor. I attain this object by the construction illustrated in the accompanying drawings, wherein like letters of reference indicate similar parts in the several views, and in which—

Figure 1 is a perspective view of a level-glass mounted in connection with an adjustable frame and embodying my improvement. Fig. 2 is a perspective view of the glass removed from the casing, showing my improvement in connection therewith. Fig. 3 is a side elevation of my improvement, showing a construction adapted to be used in connection therewith.

A indicates the level-glass containing the spirit; B, the metallic casing, which is open on its lower side to adapt it to inclose the glass level; C, the rubber sheath constituting my improved construction, and D a suitable frame to which the level is attached.

As shown in Fig. 1, the rubber sheathing C is constructed of a continuous strip of rubber having the opening $c$ for the inspection of the action of the bead, and an open end, $c'$, whereby the sheathing may be readily drawn over the glass, as shown in Fig. 1. As shown in Fig. 3, rubber rings $c^2$ may be placed over the ends of the sheathing when drawn over the glass A, for the purpose of adjusting the glass and its sheathing to an enlarged form of metallic casing B, and at the same time preserving the valuable advantages of my improved construction.

In mounting the glass the rubber sheathing is drawn over the same, care being taken that the proper side of the glass be adjusted in connection with the opening $c$, and when the said sheathing has been stretched over the glass it assumes the configuration thereof and fits snugly thereon. The glass and sheathing thus arranged are then placed in the metallic casing B, and the said casing closed around the said parts and mounted in connection with a frame, as D.

By the use of my improved construction no plaster-of-paris is used, as has heretofore been the custom in mounting level-glasses, and a displacement of the said glass is consequently avoided, for the reason that the rubber will form a tight connection, as will be readily understood, and that a cushion will be formed which will prevent injury to the glass, either by means of the rings $c^2$ or of the simple form of sheathing.

The novelty and utility of my improvement being obviously apparent, it is unnecessary to further enlarge upon the same herein.

Having thus described my invention, what I claim as new, and desire to secure by Letters Patent, is—

The combination, with the level-glass A, of the rubber sheathing C, the rubber rings $c^2$, surrounding the sheathing, and a metallic case, B, placed over the sheathing C and rings $c^2$ and resting against the rings $c^2$, substantially as described.

In testimony that I claim the foregoing as my own I have hereto affixed my signature in presence of two witnesses.

JAMES STUART TRUITT.

Witnesses:
GEO. R. WHITE,
JOHN L. GRIMES.